United States Patent
Bloehs

(10) Patent No.: US 12,191,536 B2
(45) Date of Patent: Jan. 7, 2025

(54) METHOD FOR PRODUCING A BIPOLAR PLATE STRAND, METHOD FOR PRODUCING A BIPOLAR PLATE AND DEVICE FOR CARRYING OUT THE METHOD

(71) Applicant: AUDI AG, Ingolstadt (DE)

(72) Inventor: Wolfgang Bloehs, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 806 days.

(21) Appl. No.: 17/433,574

(22) PCT Filed: Nov. 4, 2019

(86) PCT No.: PCT/EP2019/080047
§ 371 (c)(1),
(2) Date: Aug. 24, 2021

(87) PCT Pub. No.: WO2020/173585
PCT Pub. Date: Sep. 3, 2020

(65) Prior Publication Data
US 2022/0149395 A1     May 12, 2022

(30) Foreign Application Priority Data
Feb. 25, 2019    (DE) ...................... 10 2019 202 493.9

(51) Int. Cl.
*H01M 8/0297*     (2016.01)
*B23K 20/00*     (2006.01)
(Continued)

(52) U.S. Cl.
CPC ......... *H01M 8/0297* (2013.01); *B23K 20/008* (2013.01); *H01M 8/0267* (2013.01); *H01M 8/0206* (2013.01)

(58) Field of Classification Search
CPC ............. H01M 8/0297; H01M 8/0267; H01M 8/0258; H01M 8/0254; H01M 8/026; B23K 20/008; B23K 20/02
See application file for complete search history.

(56) References Cited

U.S. PATENT DOCUMENTS 5,034,288 A * 7/1991 Bossel ................ H01M 8/0258
429/479
2004/0072053 A1   4/2004 Schlag
(Continued)

FOREIGN PATENT DOCUMENTS

DE        196 40 612 C1    6/1998
DE   10 2010 054 617 A1    6/2012
(Continued)

OTHER PUBLICATIONS

Fux, "Roll Plated Copper Aluminum Connector," in *Fraunhofer IWS Annual Report 2010*, Fraunhofer Institute for Material and Beam Technology IWS, Dresden, 2010, pp. 42-43.
(Continued)

*Primary Examiner* — Basia A Ridley
*Assistant Examiner* — Heng M. Chan
(74) *Attorney, Agent, or Firm* — Seed IP Law Group LLP

(57) ABSTRACT

A method for producing a bipolar plate strand comprises: providing a first and a second unipolar plate strand, the unipolar plate strands comprising a plurality of webs and a plurality of channels extending between two adjacent webs in each case, guiding the unipolar plate strands towards a rolling gap of a pair of rollers of a rolling device provided with rolling structures, local heating of one surface area of a surface of at least one of the unipolar plate strands, the surface area immediately before or upon entry of the unipolar plate strands into the rolling gap being heated to a joining temperature, and joining the unipolar plate strands at the at least one surface area to form a bipolar plate strand
(Continued)

during transport of the unipolar plate strands through the rolling gap under the action of pressure.

10 Claims, 4 Drawing Sheets

(51) Int. Cl.
*H01M 8/0206* (2016.01)
*H01M 8/0267* (2016.01)

(56) References Cited

U.S. PATENT DOCUMENTS

| | | |
|---|---|---|
| 2005/0252892 A1 | 11/2005 | Newman et al. |
| 2009/0151847 A1 | 6/2009 | Zhamu et al. |

FOREIGN PATENT DOCUMENTS

| | | | |
|---|---|---|---|
| DE | 10 2010 056 016 A1 | 6/2012 | |
| DE | 10 2014 101 899 A1 | 8/2015 | |
| DE | 10 2016 125 502 A1 | 6/2018 | |
| EP | 0 904 886 B1 | 6/2003 | |
| EP | 2090395 A2 * | 8/2009 | ........... B23K 13/015 |
| EP | 2 090 395 B1 | 9/2016 | |
| JP | 2007066868 A | 3/2007 | |
| JP | 2009-193868 A | 8/2009 | |
| JP | 2013-152941 A | 8/2013 | |
| WO | 2007/135509 A1 | 11/2007 | |

OTHER PUBLICATIONS

International Preliminary Report on Patentability for International Application No. PCT/EP2019/080047, dated May 17, 2021. (5 pages).

International Search Report for International Application No. PCT/EP2019/080047, dated Feb. 17, 2020. (6 pages).

Schleuß et al., "Seam Welding of Structured Sheets," in *Final Report for AiF Research Project. IGF No.: 17621 BG / DVS No. 04057*, German Federation of Industrial Research Associations, May 2015, 37 pages. (with English Translation).

* cited by examiner

METHOD FOR PRODUCING A BIPOLAR PLATE STRAND, METHOD FOR PRODUCING A BIPOLAR PLATE AND DEVICE FOR CARRYING OUT THE METHOD

BACKGROUND

Technical Field

Embodiments of the invention relate to a method for producing a bipolar plate strand which has a plurality of contiguous bipolar plates of a fuel cell. Embodiments of the invention also relate to a method for producing a bipolar plate of a fuel cell, and a device for carrying out the two methods.

Description of the Related Art

Bipolar plates are used in fuel cells and fuel cell stacks. Using the bipolar plates, on the one hand, the fuel is conveyed and distributed to an adjacent anode of a first fuel cell and the cathode gas is conveyed and distributed to a cathode of an adjacent second fuel cell, the bipolar plate also providing lines for conveying a cooling medium. A bipolar plate is usually made from two unipolar plates formed as half-shells, which are glued together in the case of bipolar plates made of graphite. Metallic bipolar plates typically comprise two unipolar plates welded to one another at least in sections.

US 2005/0252 892 A1 describes, for example, a welding method for welding two unipolar plates together to form a bipolar plate. US 2004/072 053 A1 also describes a method and a device for welding two unipolar plates together to form a bipolar plate or for welding the two unipolar plates to a spacer plate. Ultimately, WO 2007/135 509 A1 also shows the possibility of welding together two unipolar plates to form a bipolar plate by means of a laser beam.

All of the methods and devices described in the above-mentioned publications direct the laser beam for welding onto the unipolar plates essentially perpendicular to the plane in which the unipolar plates extend. This creates weld seams, which can result in continuous seams that fulfill a sealing function. So-called stitching seams can also be formed, which provide mechanical stabilization of the bipolar plate and improved electrical contacting of the unipolar plates.

It has been found that with such laser-welded bipolar plates there is a risk of pore formation, which can lead to local leaks in terms of media flow. Such leaks occur statistically in particular on welds that extend particularly far. It is also known that leaks occur more frequently at the start and end of the seam, i.e., the risk of leaks increases with the number of weld seams used and their length. In addition, it has proven to be complex and difficult for laser welding to be able to clamp the two unipolar plates in a clamping device in such a way that the laser beam hits the desired point to be welded in a focused manner. Some bipolar plate manufacturers have therefore switched to providing additional embossing on channels and/or webs of the unipolar plates in order to provide space for the clamping means of the clamping device, which have a sufficient width for the weld seam to be placed. The additional embossing also creates reserves in terms of tolerances to be compensated for when positioning components.

BRIEF SUMMARY

Embodiments provide a method for producing a bipolar plate strand, a method for producing a bipolar plate, and a device for carrying out the method, that reduce or completely eliminate at least some of the disadvantages mentioned above.

The method for producing a bipolar plate strand, which has a plurality of contiguous bipolar plates of a fuel cell, comprises in particular the following steps:

providing a first unipolar plate strand and a second unipolar plate strand, the unipolar plate strands comprising a plurality of at least preformed webs and a plurality of at least preformed channels extending between two adjacent webs in each case, guiding the unipolar plate strands towards a rolling gap of a pair of rollers of a rolling device or means provided with rolling structures, local heating of at least one surface area of a surface of one or both of the unipolar plate strands, the surface area immediately before or upon entry of the unipolar plate strands into the rolling gap being heated to a joining temperature, and joining the unipolar plate strands at the at least one surface area to form a bipolar plate strand during transport of the unipolar plate strands through the rolling gap under the action of pressure.

When heating the unipolar plate strands to the joining temperature, an oven can be used for example. When transporting the two unipolar plate strands, they are then reliably joined to form a bipolar plate strand.

The local heating may be carried out by a laser beam or by several laser beams of at least one laser device or means. There can also be several laser devices or means. The laser beam or the laser beams may be focused laterally with respect to a feed direction of the rolling device or means on at least one of the surfaces, but in some embodiments on both surfaces of the two unipolar plate strands to be joined, or suitably shaped so that at least on the surface or at least close to the surface the temperature required for welding, namely the joining temperature, prevails. During transport through the rolling gap under the action of pressure, the joining forces required for a final joining of the two unipolar plate strands are then applied.

As a result of using this selective roll welding, no additional, usually extremely complex clamping technology is required in addition to the actual welding tool. Due to the fact that clamping technology can be dispensed with, the channel and web geometries of the bipolar plates can be further optimized in terms of flow.

The laser device or means may be configured to move the laser beam vertically with respect to the direction of advance of the pair of rollers, in particular, laterally focused or with an adapted intensity distribution, in order to heat several contact points or contact lines, that is to say several surface areas of the two unipolar plates, to the joining temperature.

Instead of such a dynamic adjustment of the orientation and/or focusing or shaping of the laser beam, a stationary laser device may additionally comprise a beam splitting device which is configured to split the laser beam into a plurality of laser beams in such a way that a plurality of surface areas of the unipolar plate strands can be heated simultaneously.

There can be constellations in which the heating by the laser device or means, either due to the splitting of the laser beam or due to the only brief exposure to the laser, is not sufficient to heat the material of the two unipolar plate strands to its joining temperature. It has therefore proven to be useful if at least one or both of the unipolar plate strands are preheated before being guided to the rolling gap. For this purpose, an induction heating device or means or an infrared radiator can be available.

If the two sheets of the unipolar plate strands to be joined are not yet preformed and possibly still flat, that is to say, are in the form of flat material, the webs and the channels may be embossed by at least one embossing device or means before the unipolar plate strands are provided to the rolling device or means. This also opens up the possibility that the webs and the channels of the unipolar plate strands are already pressed into their final shape; that is to say they are supplied the pair of rollers not in a pre-shaped but in a finished-shaped state.

If, however, only preformed webs and channels are formed on the bipolar plate strands by the embossing device or means, the preformed webs and the preformed channels may be pressed into their final shape during transport through the rolling gap under the action of pressure by the rolling structures.

Depending on the material selection or material combination of the unipolar plates or unipolar plate strands, it has proven to be useful if the bipolar plate strand is relaxed, in particular reheated or annealed, by a heating device or means. This increases the strength of the connection between the two unipolar plates when forming the bipolar plate.

In order to provide the sealing with respect to the reaction media required for use in a fuel cell stack and/or a reliable sealing to prevent leakage of coolant, at least one seal may be applied to at least one or to both of the outer surfaces of the bipolar plate strand by an application device or means. For this purpose, the application device or means can be, for example, a printing device that screen-prints a sealing material onto the outer surfaces of the bipolar plate strand. After the sealing material has been applied, it can cure at a predetermined temperature, for which purpose the application device can additionally have a suitable heating device or means.

Depending on the material concept chosen for the entire fuel cell, an additional coating of the bipolar plate is often desired. It has therefore proven to be useful in this context if at least one coating is applied by a coating device or means to at least one or to both of the outer surfaces of the bipolar plate strand. A printing device can also be used for this purpose, which applies the desired coating material to the outer surfaces, for example by roller printing. The printing device or means can also comprise a suitable heating device or means in order to dry the applied coating material. The coating can take place, for example, after a seal has been applied. However, there is also the possibility that the coating is applied first and only later the outer surfaces are provided with at least one seal.

In order to produce a bipolar plate cut to final dimensions for use in a fuel cell stack, the possibility is opened up that the bipolar plate strand is divided into individual bipolar plates by a cutting device or means. The cutting of the still connected bipolar plates into stackable units at the end of the manufacturing process has the advantage that the position tolerances of the individual process steps can be significantly reduced in this way.

The advantages and design variants described for the method for producing a bipolar plate strand also apply to the method described herein for producing a bipolar plate of a fuel cell, since the device used for this purpose is also suitable and designed to join unipolar plates that have already been cut to final dimensions to form a bipolar plate instead of rod materials, hence to weld them.

The method described herein for producing the bipolar plate therefore comprises in particular the following steps:
providing a first unipolar plate and a second unipolar plate, the unipolar plates comprising a plurality of at least preformed webs and a plurality of at least preformed channels extending between two adjacent webs in each case,
guiding the unipolar plates towards a rolling gap of a pair of rollers of a rolling device or means provided with rolling structures,
local heating of at least one surface area of a surface of one or both of the unipolar plates, the surface area immediately before or upon entry of the unipolar plates into the rolling gap being heated to a joining temperature, and
joining the unipolar plates at the at least one surface area to form a bipolar plate during transport of the unipolar plates through the rolling gap under the action of pressure.

This method for joining two unipolar plates to form a bipolar plate also eliminates the disadvantages known from the prior art.

Here, too, it has proven to be useful if the local heating is carried out by a laser beam or by several laser beams from at least one laser device or means. The use of several laser devices or means is possible.

The device described herein for producing a bipolar plate strand or for producing a bipolar plate in particular comprises a rolling device or means with a pair of rollers forming a rolling gap between them. In addition, there is a heating device or means that is designed to increase at least one surface area of a surface of one or both of the two unipolar plate strands to a joining temperature. Alternatively or in addition, it can also be designed to heat a surface area of a surface of one or both of the unipolar plates to a joining temperature. At least one of the rollers of the pair of rollers is provided with a rolling structure which is designed to press a plurality of surface areas of the two unipolar plates or of the two unipolar plate strands heated to the joining temperature during transport through the rolling gap in such a way that the two unipolar plate strands are joined to form a bipolar plate strand at the surface areas, or that the two unipolar plates are joined to form a bipolar plate at the surface areas.

For example, the surface areas in the rolling gap form a plurality of contact lines from superimposed webs of two unipolar plates or two unipolar plate strands when they are pressed during transport through the rolling gap under the action of pressure.

The heating device or means may be formed as a laser device or means which has at least one optical system which is designed to focus or suitably shape at least one laser beam or several laser beams in an area of or in the immediate vicinity of the rolling gap. The laser device or means is designed to increase at least one surface area of a surface of one or both of the two unipolar plate strands to a joining temperature. There is a possibility to use several laser devices or means.

In other words, the laser device or means is formed to heat the material of the unipolar plates to a joining temperature in their areas to be joined, that is to say locally on the surface of the unipolar plates, in particular locally on the webs of the unipolar plate strands or unipolar plates. The subsequent rolling device or means is formed to apply the necessary joining force during transport of the two unipolar plates or of the two unipolar plate strands through the rolling gap in order to connect the two polar plates or unipolar plate strands permanently to one another to form a bipolar plate or a bipolar plate strand.

The laser device or means may be associated with a controller which is designed to control the optics of the laser device or means. The optics of the laser device or means can be adjusted, in particular, in a lateral direction in such a way that the laser beam can be adjusted essentially perpendicular to the feed direction of the rolling device or means. The optics can be moved so quickly that a plurality of surface areas can be heated by the laser beam in order to form a plurality of joined contact lines or contact points between the two unipolar plates or between the two unipolar plate strands during transport through the rolling gap.

Alternatively or in addition, the possibility is opened up that the laser meaning is assigned a beam splitting device or means for splitting the laser beam in such a way that a plurality of surface areas or contact lines can be heated simultaneously.

By using such a device, the risks of leaks in the subsequent bipolar plate are drastically reduced as a matter of principle, which also significantly reduces the expected production scrap. The laser device or means, in particular its optics, enables good local and temporal controllability (or, if necessary, also adjustability) of the heat source and thus robust process management and high welding quality.

One embodiment provides that at least one of the unipolar plates or at least one of the unipolar plate strands is straightened, that is to say smoothed, by a straightening device or means, before webs or channels are introduced into it. For this purpose, the device has one or two straightening devices or means.

In addition, the possibility is opened up that an embossing device or means is present in order to at least preform the plurality of webs and the plurality of channels, especially to emboss into the material. It is possible in this case that each unipolar plate strand is assigned its own embossing device or means. Alternatively, a combined embossing device or means can also be provided which embosses the two unipolar plate strands.

In order to preheat the unipolar plate strands or the unipolar plates before being guided to the rolling gap, there may be at least one induction heating device or means which inductively heats one of the unipolar plates or of the unipolar plate strands. Alternatively or in addition, an infrared radiator can also be present to preheat the material. As a result, the subsequent laser beam must have a lower energy level in order to heat the materials to their joining temperature, which means that the laser device or means can be designed to be smaller.

The device can also comprise a heating device downstream of the rolling device or means, which is designed to relax the material of the bipolar plate strand or of the bipolar plate, in particular to anneal it.

In addition, the device can comprise an application device or means downstream of the roller device, which application device or means is designed to apply a seal to at least one of the outer surfaces of the bipolar plate strand or of the bipolar plate. A printing device as already explained above can be used for this purpose.

In addition, the possibility is opened up that the device comprises a coating device or means downstream of the rolling device or means, which is designed to provide at least one of the outer surfaces of the bipolar plate strand or of the bipolar plate with a coating. For this purpose, too, this coating device or means can comprise the printing device already mentioned above, which applies the coating using the web printing process, for example.

The device can also comprise a cutting device or means which is designed to separate a bipolar plate strand into individual bipolar plates or to cut a bipolar plate to a final dimension.

The features and feature combinations mentioned above in the description as well as the features and feature combinations mentioned below in the description of the figures and/or shown alone in the figures can be used not only in the specified combination, but also in other combinations or on their own, without to leave the scope of the invention. Thus, there are also embodiments to be regarded as encompassed and disclosed by the invention, which are not explicitly shown or explained in the figures, but emerge from the explained embodiments and can be generated by separate combinations of features.

BRIEF DESCRIPTION OF THE SEVERAL VIEWS OF THE DRAWINGS

Further advantages, features and details emerge from the claims, the following description of embodiments and the drawings.

DETAILED DESCRIPTION

Figure 1:
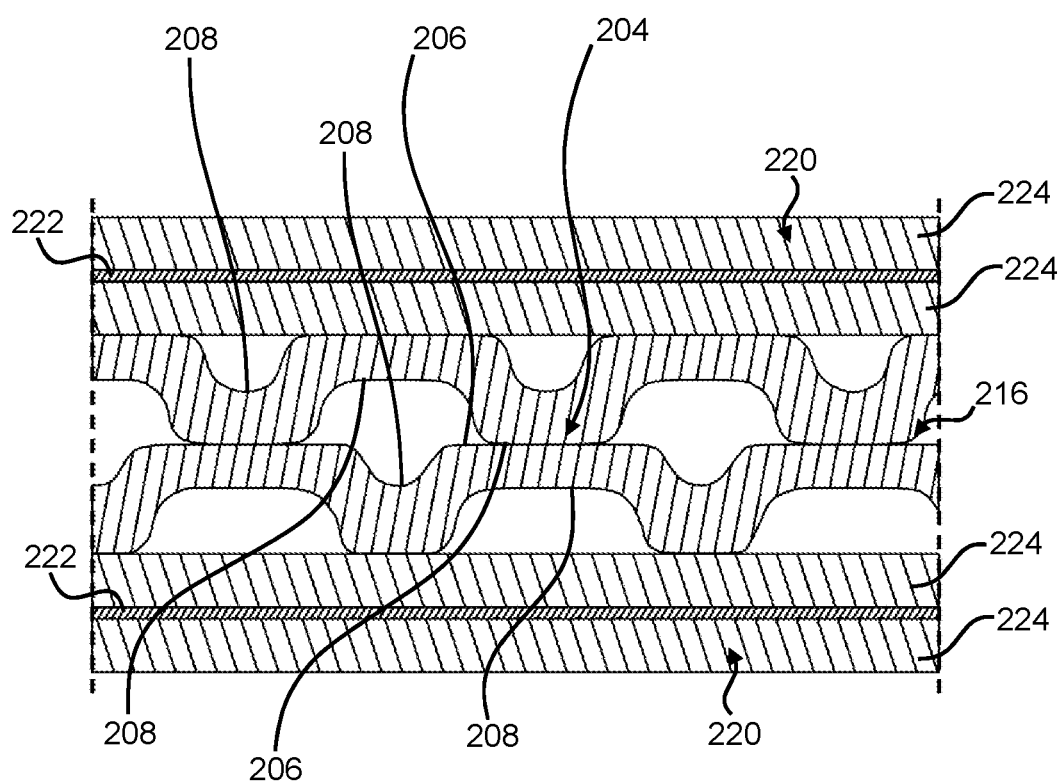
FIG. 1 shows a sectional detailed view of a section of a fuel cell stack with a bipolar plate formed from two unipolar plates.

In FIG. 1, the section of a fuel cell stack can be seen, which is formed from several fuel cells 220. Each fuel cell 220 is formed with a membrane electrode assembly 222, which comprises a proton conductive membrane, to which an electrode is assigned on each side. Membrane electrode assembly 222 is configured to carry out the electrochemical reaction of the fuel cell. For this purpose, fuel (e.g., hydrogen) is fed to the electrode forming the anode, where it is catalytically oxidized to form protons by releasing electrons. These protons are transported to the cathode through the proton-conductive membrane (or ion exchange membrane). The electrons dissipated from the fuel cell flow via an electrical load, such as via an electric motor, to the drive system of a vehicle, or to a battery. Then, the electrons are conducted to the cathode or electrons are provided at the cathode. At the cathode, the oxidation medium (e.g., oxygen or air containing oxygen) is reduced to anions by taking up electrons, which anions react directly with the protons to form water.

Using bipolar plates 216, the fuel or the cathode gas are passed to gas diffusion layers 224, which guide the respective gases in a diffusely distributed manner to the electrodes of membrane electrode assembly 222. The fuel, the oxidation medium and, optionally, a cooling medium are passed through channels 208 of bipolar plate 216, which are delimited on both sides by webs 206 of the bipolar plates 216 that have backs. As can be seen from FIG. 1, for this purpose one set of the web backs rests against a gas diffusion layer 224 so that a reactant flowing in channels 208 can be delivered to gas diffusion layer 224 and thus to the electrode of membrane electrode assembly 222.

In the present case, bipolar plate 216 comprises two unipolar plates which are placed one on top of the other and which are selectively connected, in particular welded, on their webs 206 facing each other, in particular on their respective webs backs. Webs 206 of the unipolar plates facing each other typically form lines for a cooling medium with channels 208 located between webs 206.

It can also be seen from FIG. 1 that webs 206 or their web backs of the unipolar plates do not necessarily have to have the same width, so that channels 208 can have different widths and/or depths. For a permanent connection of two unipolar plates, however, it should be ensured that at least two of the opposing webs 206 lie on top of one another and can be permanently connected to one another, in particular can be welded.

A device 100 for producing a bipolar plate strand 214 is explained with reference to FIG. 2, bipolar plate strand 214 having a plurality of contiguous bipolar plates 216 of a fuel cell 218. This device 100 is also designed to produce a bipolar plate 216 directly; even without prior production of such a bipolar plate strand 214.

In the present case, the raw materials or the raw material of bipolar plate 216 are/is provided at an unwinding device or means 140 or at a plurality of unwinding devices or means 140, which comprise(s) a first roll 128 and a second roll 130. The rolls 128, 130 provide the raw material for a first unipolar plate strand 200 and for a second unipolar plate strand 202. In order to straighten the material of first roll 128, first unwinding device or means 140 of first roll 128 is followed by a first straightening device or means 132. In order to straighten the material of second roll 130, second unwinding device or means 140 of the second roll 130 is followed by a second straightening device or means 134. The raw material unwound from first roll 128 and straightened with first straightening device or means 132 is processed by a first embossing device 114 in such a way that first unipolar plate strand 200 is provided with a plurality of at least pre-formed webs 206 and a plurality of at least pre-formed channels 208 extending between two adjacent webs 206 in each case. The raw material unwound from second roll 130 and straightened with second straightening device 134 is processed by a second embossing device 116 in such a way that second unipolar plate strand 202 is provided with a plurality of at least preformed webs 206 and a plurality of at least preformed channels 208 extending between two adjacent webs 206 in each case.

Unipolar plate strands 200, 202 formed in this way are then moved towards a roller device 102, optionally with the aid of suitable deflection device or means, onto a rolling gap 104 of a pair of rollers 106 provided with rolling structures 112. The two unipolar plate strands 200, 202 converge at an inlet angle with respect to rolling gap 104. Before the two unipolar plate strands 200, 202 meet at rolling gap 104, they are first preheated if necessary. The preheating of first unipolar plate strand 200 takes place by a first induction heating device or means 136 for inductively heating the material of first unipolar plate strand 200. The heating of second unipolar plate strand 202 takes place by a second induction heating device 138 for inductively heating the material of second unipolar plate strand 202.

The device 100 also comprises a laser device or means 108 which is designed to emit a laser beam 110 which is focused or focusable or suitably shaped in or at rolling gap 104 or in the immediate vicinity of rolling gap 104. In this case, laser beam 110 is designed to locally heat at least one, but in some embodiments several surface areas of a surface 210, 212 of the two unipolar plate strands 200, 202. The heating takes place in particular on surface areas of surfaces 210, 212 facing one another when unipolar plate strands 200, 202 enter rolling gap 104. In this case, the surfaces to be heated may have some of the web backs of webs 206 or are formed from them. Due to the preheating by induction heating devices or means 136, 138 and by the action of heat by laser beam 110, the material of unipolar plate strands 200, 202 is heated to a joining temperature. It is not absolutely necessary in this case for the joining temperature to be present over the entire material cross section of unipolar plate strands 200, 202, so that a graded temperature distribution can be present in cross section. During the continuous transport of the two unipolar plate strands 200, 202 placed on top of one another, a joining pressure is exerted on the at least one surface area which is heated to the joining temperature by the pair of rollers 106 of rolling device or means 102, such that the two unipolar plate strands 200, 202 are joined, that is to say welded, to form a joint bipolar plate strand 214.

In this case, the optics of laser device or means 108 may be configured to adjust laser beam 110 laterally to the transport direction above the material of the unipolar plate strands 200, 202, so that a plurality of areas heated to the joining temperature are created on unipolar plate strands 200, 202 that are joined, that is to say welded, when applying a joining pressure by rolling device or means 102. Alternatively, a beam splitting device can also be present which splits laser beam 110 into a plurality of laser beams 110 in order to heat a plurality of surface areas of one or both unipolar plate strands 200, 202 to the joining temperature.

Figure 3:
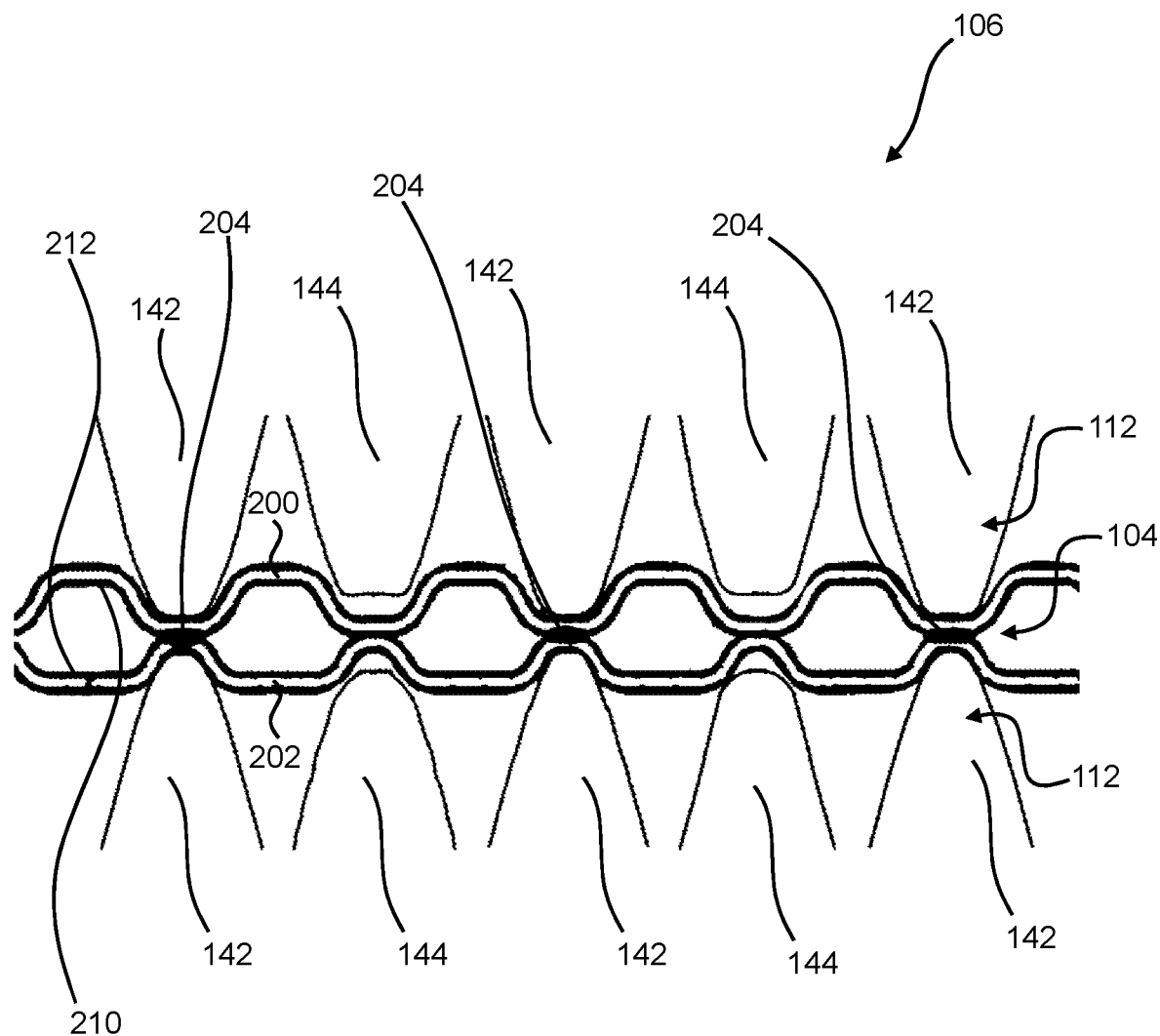
FIG. 3 shows a detailed view of the rolling gap of the pair of rollers with unipolar plates located therein or unipolar plate strands located therein.

In FIG. 3, it can be seen that rolling structure 112 of the rollers of pair of rollers 106 can have different roller elevations 142, 144, which, in a contact area 204, either lead to a joining of the two unipolar plate strands 200, 202 due to the acting joining pressure or where this is not the case. Thus, on the one hand, there are active roller elevations 142, between which the rolling gap 104 leads to a joining of the two unipolar plate strands 200, 202 located therein, and, on the other hand, there are passive roller elevations 144, between which rolling gap 104 does not lead to a permanent connection of the two unipolar plate strands 200, 202. Roller elevations 142, 144 can also only be located in sections on the circumference of the relevant roller. For example, active roller elevations 142 are arranged on the circumference, radially at predefined intervals, so that, for example, stitch welds or tack welds can be generated between the plate strands, thus allowing to reduce the weld seam length and thus the process time. In this context, the possibility is opened up that each roller, depending on rolling structure 112, can generate a defined number of short tack/stitch welds as it rolls. For passive roller elevations 144, or also for altogether passive rollers, there is also the possibility that they are only designed as guides for the plate strands.

Instead of using active roller elevations 142 and passive roller elevations 144 of rolling structure 112, laser device 108 can also be used to control in which areas of unipolar plate strands 200, 202 the material is heated to a joining temperature, so that during transport through transport gap 104 a joining takes place there. For this purpose, laser device or means 108 is designed to specifically allow areas of surfaces 210, 212 to be un-irradiated by laser beam 110 or irradiated with reduced power, so that these areas are not heated to the joining temperature required for joining. These areas not heated to the joining temperature are then not joined to one another under the action of pressure, despite the transport through rolling gap 104.

Figure 2:
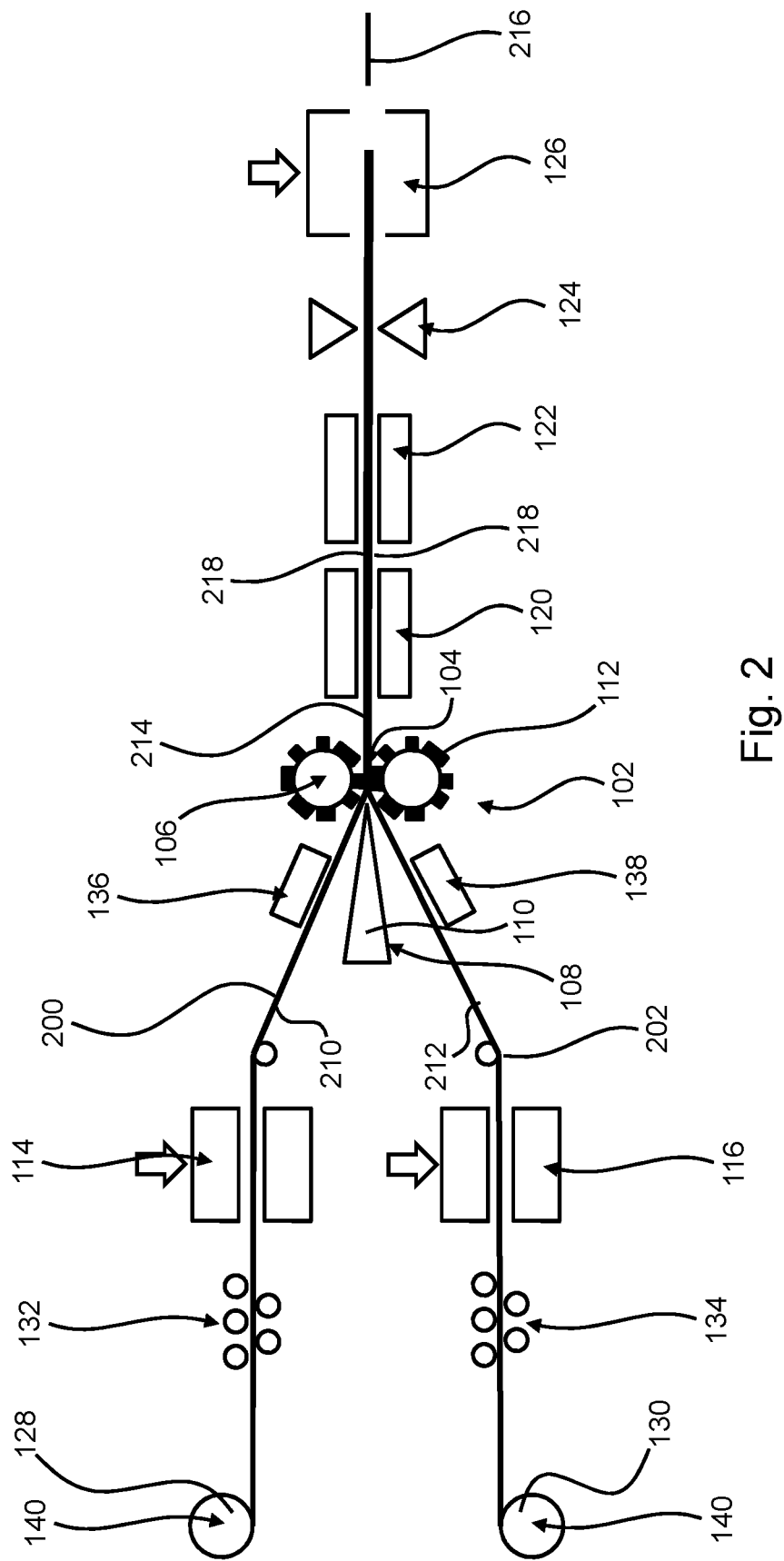
FIG. 2 shows a schematic view of a system for producing a bipolar plate strand from two unipolar plate strands and/or a bipolar plate from two unipolar plates.

As can be seen again from FIG. 2 in regards to device 100, rolling device or means 102 is followed by a heating device 120 for relaxing resulting bipolar plate strand 204, in particular for annealing bipolar plate strand 214. Heating device or means 120 is followed by an application device or means 122 which is designed to apply a seal to at least one, such as to both, outer surfaces 218 of bipolar plate strand 214. Application device or means 122 of device 100 is also followed by a coating device or means 124, which is designed to apply a suitable coating to at least one, such as both of outer surfaces 218 of bipolar plate strand 214. Coating device or means 124 is also followed by a cutting device or means 126 in order to separate bipolar plates 216 connected in bipolar plate strand 214 and, optionally, to cut them to a desired final dimension; individual bipolar plates 216 are also provided in this way.

Figure 4:
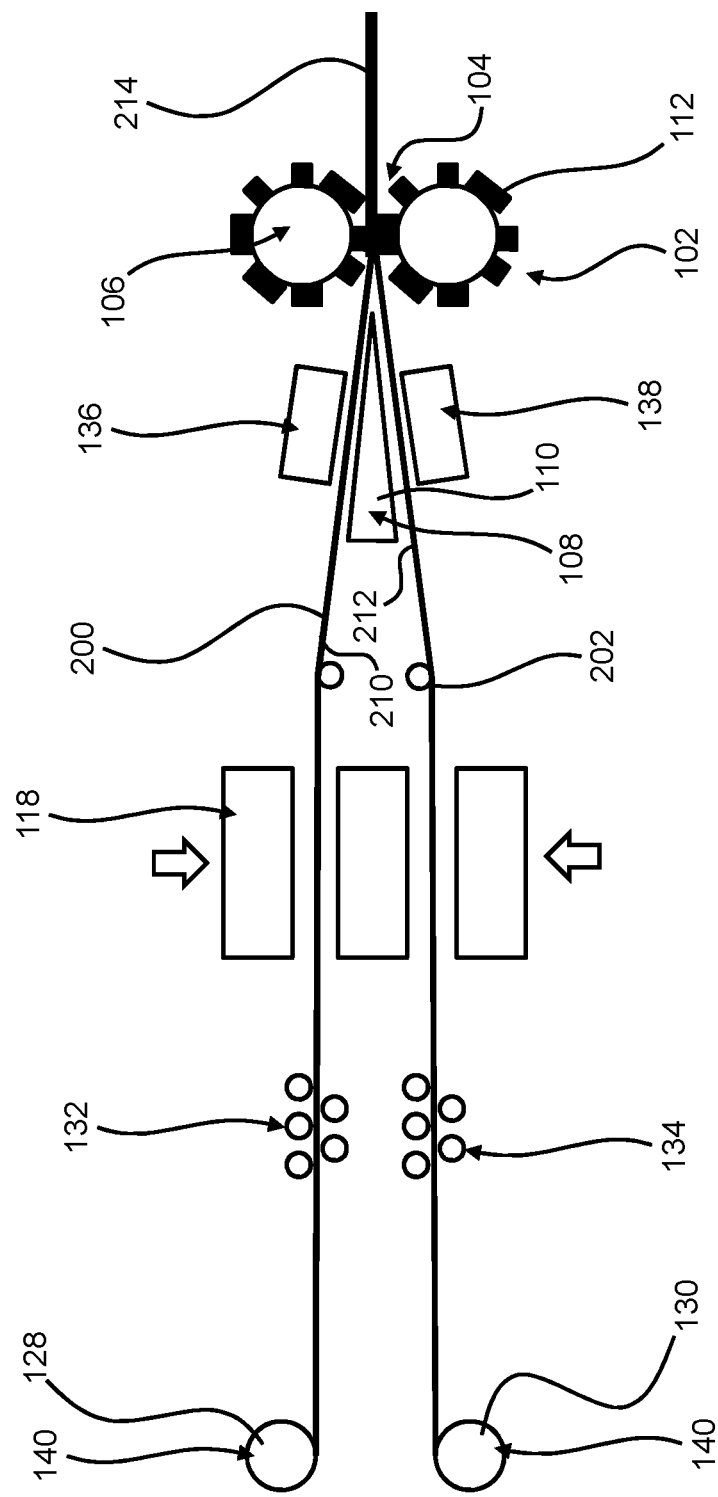
FIG. 4 shows a schematic view of a device for producing a bipolar plate strand from two unipolar plate strands and/or for producing a bipolar plate from two unipolar plates.

FIG. 4 shows a further variant of device 100 for producing bipolar plates 216, which differs from the variant according to FIG. 2 only with regard to the configuration of the embossing device or means. In this case, the embossing device or means is formed as a combined embossing device or means 118 which can jointly emboss the raw material of first unipolar plate strand 200 and the raw material of second unipolar plate strand 202. There is therefore no need for a more complex configuration with a first embossing device 114 and a second embossing device 116. In addition, the inlet angle of the two unipolar plate strands 200, 202 into rolling gap 104 of rolling device or means 102 is reduced, which increases the lack of distortion of bipolar plate strand 214 and bipolar plates 216 separated therefrom.

As a result, the present disclosure specifies a device 100 and a method for producing bipolar plates 216 or bipolar plate strands 214, which allow production of bipolar plates 216 in very large numbers and in a short cycle time. Device 100 and the specified methods are therefore suitable for series production and reduce the reject rate in the production of bipolar plates 216 compared to known methods and devices. The weld connections formed as described herein ensure the required tightness and the required electrical contacting of the two unipolar plates or their strands.

Aspects and features of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for producing a bipolar plate strand having a plurality of contiguous bipolar fuel cell plates, comprising:
   providing a first unipolar plate strand and a second unipolar plate strand, the first and second unipolar plate strands each comprising a plurality of webs and a plurality of channels, each channel extending between two adjacent webs;
   guiding the first and second unipolar plate strands towards a rolling gap of a pair of rollers of a rolling device provided with a rolling structure, the rolling structure having active roller elevations and passive roller elevations;
   locally heating at least one surface area of a surface of one or both of the first and second unipolar plate strands, to a joining temperature immediately before or upon entry of the first and second unipolar plate strands into the rolling gap; and
   joining the first and second unipolar plate strands to one another at the at least one surface area to form a bipolar plate strand during transport of the first and second unipolar plate strands through the rolling gap under the action of pressure, wherein the active roller elevations join the first and second unipolar plate strands located in the rolling gap and the passive roller elevations do not join the first and second unipolar plate strands located in the rolling gap.

2. The method according to claim 1, wherein locally heating the surface area includes using a laser beam to locally heat the surface area.

3. The method according to claim 1, wherein the webs and the channels are embossed before the unipolar plate strands are provided.

4. The method according to claim 1, wherein the webs and the channels are pressed into their final shape during transport through the rolling gap under the action of pressure by the rolling structures.

5. The method according to claim 1, wherein the bipolar plate strand is relaxed by application of heat.

6. The method according to claim 1, wherein at least one seal is applied to at least one outer surface of the bipolar plate strand.

7. The method according to claim 1, wherein at least one coating is applied to at least one outer surface of the bipolar plate strand.

8. The method according to claim 1, wherein the bipolar plate strand is divided into individual bipolar plates.

9. A method for producing a bipolar fuel cell plate, comprising:
   providing a first unipolar plate and a second unipolar plate, the first and second unipolar plates each comprising a plurality of webs and a plurality of channels, each channel extending between two adjacent webs;
   guiding the first and second unipolar plates towards a rolling gap of a pair of rollers of a rolling device provided with a rolling structure, the rolling structure having active roller elevations and passive roller elevations;
   locally heating at least one surface area of a surface of one or both of the first and second unipolar plates to a joining temperature immediately before or upon entry of the first and second unipolar plates into the rolling gap; and
   joining the first and second unipolar plates to one another at the at least one surface area to form a bipolar plate during transport of the first and second unipolar plates through the rolling gap under the action of pressure, wherein the active roller elevations join the first and second unipolar plates located in the rolling gap and the passive roller elevations do not join the first and second unipolar plates located in the rolling gap.

10. A device for carrying out a method for producing a bipolar plate strand having a plurality of contiguous bipolar fuel cell plates, the method comprising: providing a first unipolar plate strand and a second unipolar plate strand, the first and second unipolar plate strands each comprising a plurality of webs and a plurality of channels, each channel extending between two adjacent webs; guiding the first and second unipolar plate strands towards a rolling gap of a pair of rollers of a rolling device provided with a rolling structure, the rolling structure having active roller elevations and passive roller elevations; locally heating at least one surface area of a surface of one or both of the first and second unipolar plate strands to a joining temperature immediately before or upon entry of the first and second unipolar plate strands into the rolling gap; and joining the first and second unipolar plate strands to one another at the at least one surface area to form the bipolar plate strand during transport of the first and second unipolar plate strands through the rolling gap under the action of pressure, wherein the active roller elevations join the first and second unipolar plate strands located in the rolling gap and the passive roller elevations do not join the first and second unipolar plate strands located in the rolling gap, the device comprising:

- a heater configured to heat the at least one surface area of the surface of the one or both of the first and second unipolar plate strands to the joining temperature; and
- the rolling device including the pair of rollers forming the rolling gap between them,
- wherein at least one of the rollers of the pair of rollers is provided with the rolling structure which is configured to press a plurality of surface areas of the two unipolar plate strands heated to the joining temperature during transport through the rolling gap in such a way that the two unipolar plate strands are joined to form the bipolar plate strand at the surface areas.

* * * * *